US011781944B2

(12) United States Patent
Magnuson et al.

(10) Patent No.: US 11,781,944 B2
(45) Date of Patent: Oct. 10, 2023

(54) DETECTION OF DELTA PRESSURE SENSOR ICING

(71) Applicant: Cummins Inc., Columbus, IN (US)

(72) Inventors: Jesse Kurt Magnuson, Upland, IN (US); Soumya Nayyar, Greenwood, IN (US); Mostafa S. Raihan, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/456,973

(22) Filed: Nov. 30, 2021

(65) Prior Publication Data

US 2023/0168154 A1 Jun. 1, 2023

(51) Int. Cl.
| | | |
|---|---|---|
| G01M 15/10 | (2006.01) | |
| F02M 26/45 | (2016.01) | |
| F02M 26/49 | (2016.01) | |
| G01K 3/00 | (2006.01) | |
| F02M 26/47 | (2016.01) | |

(52) U.S. Cl.
CPC .......... *G01M 15/106* (2013.01); *F02M 26/45* (2016.02); *F02M 26/47* (2016.02); *F02M 26/49* (2016.02); *G01K 3/005* (2013.01); *G01K 2205/04* (2013.01)

(58) Field of Classification Search
CPC ..... G01M 15/106; F02M 26/45; F02M 26/47; F02M 26/49; G01K 3/005; G01K 2205/04
See application file for complete search history.

(56) References Cited

U.S. PATENT DOCUMENTS

| | | | | |
|---|---|---|---|---|
| 5,241,940 A | * | 9/1993 | Gates, Jr. ............... | F02M 26/35 123/676 |
| 6,192,866 B1 | * | 2/2001 | Araki ..................... | G01L 27/007 73/114.37 |
| 6,363,922 B1 | * | 4/2002 | Romzek ................. | F02M 26/47 73/114.74 |
| 6,850,833 B1 | * | 2/2005 | Wang ..................... | G01F 25/10 73/114.74 |
| 2017/0321570 A1 | * | 11/2017 | Scothern .................. | F02C 9/18 |
| 2018/0179940 A1 | * | 6/2018 | Hall ...................... | B01D 46/446 |

(Continued)

FOREIGN PATENT DOCUMENTS

| | | |
|---|---|---|
| CN | 110469403 | 11/2019 |
| CN | 110514354 | 11/2019 |

(Continued)

*Primary Examiner* — Logan M Kraft
*Assistant Examiner* — Susan E Scharpf
(74) *Attorney, Agent, or Firm* — Taft Stettinius & Hollister LLP

(57) ABSTRACT

An engine system includes a delta pressure sensor configured to sense a pressure difference across an engine exhaust handling component and an electronic control system configured to determine a cold sensor condition permitting icing of the delta pressure sensor, determine a sensed pressure deviation condition indicative of deviation of the pressure difference sensed by the delta pressure sensor from a deviation limit, dynamically model a sensor heat transfer condition indicative of heating or cooling of the delta pressure sensor, determine that the sensor heat transfer condition is indicative of insufficient heating of the delta pressure sensor to mitigate icing of the delta pressure sensor, and determine an icing condition of the delta pressure sensor.

26 Claims, 6 Drawing Sheets

(56) References Cited

U.S. PATENT DOCUMENTS

| | | | |
|---|---|---|---|
| 2019/0120101 A1* | 4/2019 | Dadam | F01N 9/00 |
| 2019/0120103 A1* | 4/2019 | Jentz | F01N 3/0205 |
| 2020/0263625 A1* | 8/2020 | Yamane | F02D 41/2432 |
| 2020/0284181 A1* | 9/2020 | Matsumoto | F01N 11/002 |
| 2022/0213830 A1* | 7/2022 | Schlintl | F02D 41/1448 |

FOREIGN PATENT DOCUMENTS

| | | |
|---|---|---|
| CN | 110132381 | 9/2020 |
| CN | 110487481 | 3/2021 |
| DE | 102009057735 | 7/2010 |
| WO | 2020201648 | 10/2020 |
| WO | 2021058250 | 4/2021 |

\* cited by examiner

DETECTION OF DELTA PRESSURE SENSOR ICING

TECHNICAL FIELD

The present application relates to apparatuses, methods, systems, and techniques of detecting or diagnosing icing of delta pressure sensors.

BACKGROUND

Delta pressure sensors, sometimes referred to as differential pressure sensors, may be utilized to sense pressures at a number of locations in an engine system including, for example, at an intake manifold or other intake system location, an exhaust manifold or other exhaust system location, an EGR valve or other EGR system location, or the ambient environment of the engine system. The operation of delta pressure sensors may be impaired by an iced sensor condition in which one or more features of a delta pressure sensor is iced such that its intended operation is impaired. Examples of such features include apertures, ports, orifices, Venturi, and other structures susceptible to partial or total occlusion by icing or ice formation or whose function may be otherwise impaired by icing or ice formation. A number of proposals have been with respect to iced sensor conditions. Heretofore, such proposals have suffered from a number of drawbacks and shortcomings including, without limitation, those respecting accuracy, adaptability, complexity, precision, reliability, and robustness. There remains a significant need for the unique apparatuses, methods, systems, and techniques disclosed herein.

DISCLOSURE OF EXAMPLE EMBODIMENTS

For the purposes of clearly, concisely, and exactly describing example embodiments of the present disclosure, the manner, and process of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created, and that the invention includes and protects such alterations, modifications, and further applications of the example embodiments as would occur to one skilled in the art.

SUMMARY

Some embodiments include unique apparatuses, methods, systems, and techniques for determining an iced sensor condition of a delta pressure sensor. Further embodiments, forms, objects, features, advantages, aspects, and benefits shall become apparent from the following description and drawings.

DETAILED DESCRIPTION OF EXAMPLE EMBODIMENTS

Figure 1:
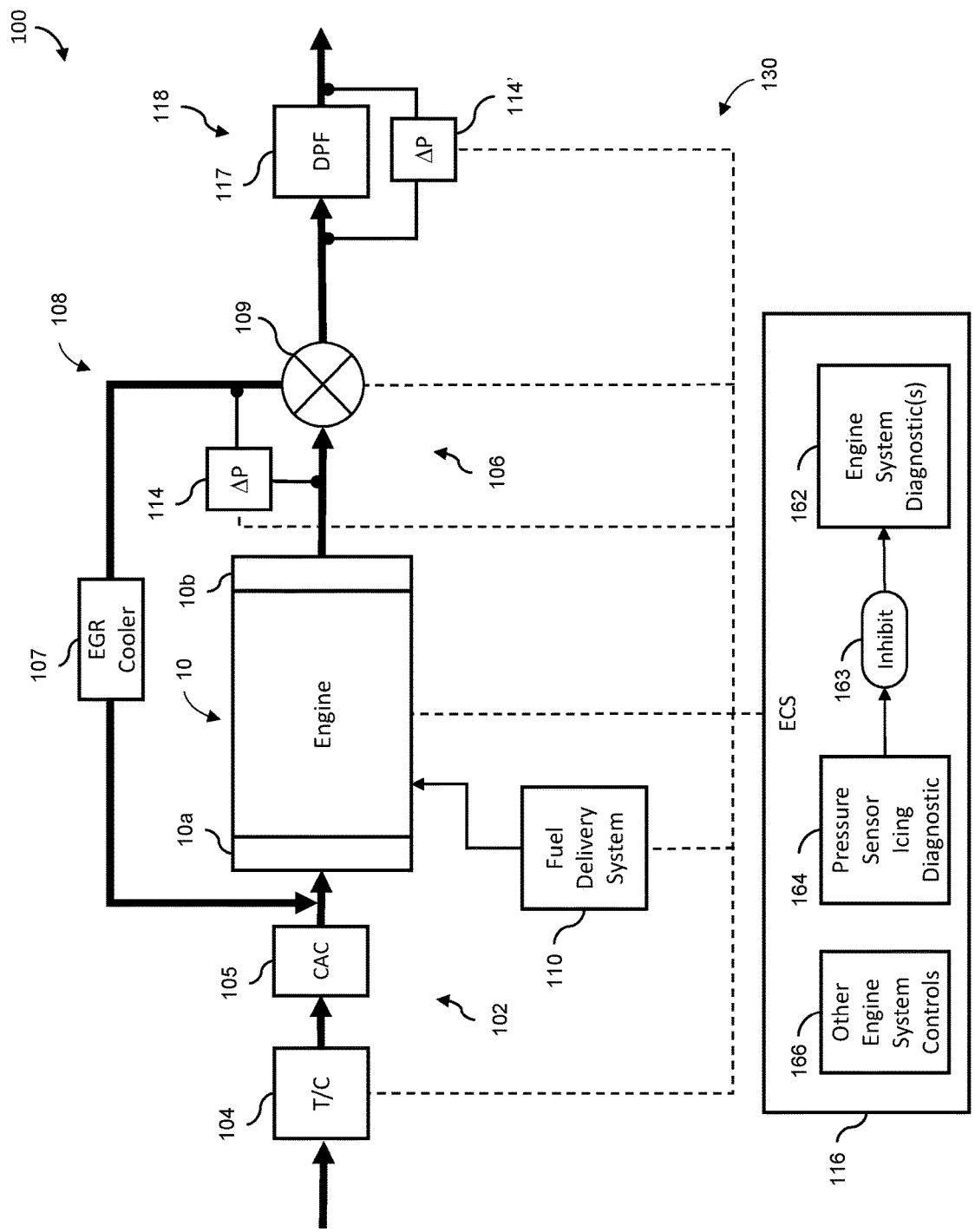
FIG. 1 a schematic diagram illustrating certain aspects of an example engine system.

With reference to FIG. 1, there is illustrated an example engine system 100. Engine system 100 includes an engine 10, an intake system 102 including an intake manifold 10*a* which is fluidically coupled with and configured to provide intake charge air to the engine 10, and an exhaust manifold 10*b* which is fluidically coupled with and configured to receive exhaust from the engine 10. In the illustrated embodiment, intake system 102 includes a turbocharger 104 fluidically coupled with and configured to provide compressed intake gases to a charge air cooler 105 and, in turn, to intake manifold 10*a*. In other embodiments, turbocharger 104 may alternatively be configured as a shaft-driven compressor or supercharger or may be omitted in the case of a naturally aspirated engine.

Engine system 100 includes EGR system 108 fluidically coupled with the intake system 102 and the exhaust system 106. It shall be appreciated that EGR system 108 and exhaust system 106, as well as their respective constituent components, are examples of exhaust handling components of engine system 100. In the illustrated embodiment, EGR system 108 is configured as a low-pressure loop EGR system 108. In other embodiments, EGR system 108 may be configured as a high-pressure loop EGR system, an EGR system with selectable high pressure and low-pressure loops, or may be omitted. EGR system 108 includes an EGR valve 109 which may be positioned at a number of locations in the exhaust system 106 and operated to control recirculation of exhaust gasses output by the engine 10 to the intake of the engine 10. EGR system 108 include an EGR cooler 107 which receives recirculated exhaust gas from EGR valve 109 and provides the received recirculated exhaust gas to the intake system, for example, at a location downstream from charge air cooler 105 or, alternatively, at a location upstream from the charge air cooler 105. EGR system 108 further includes a delta pressure sensor 114. In the illustrated embodiment, delta pressure sensor 114 is configured and provided in the form of delta pressure sensor unit which is configured to sense a pressure difference across the EGR valve 109. In other embodiments, delta pressure sensor 114 may be provided in other forms, for example, as a combination of two separate delta pressure sensors configured to sense respective pressures from which pressure difference across the EGR valve 109 can be determined, or in other forms as will occur to one of skill in the art.

Exhaust system 106 includes an exhaust aftertreatment system 118 which receives exhaust from engine 10 via other elements of exhaust system 106. In the illustrated example, exhaust aftertreatment system 118 includes a diesel particulate filter (DPF) 117 which is configured to mitigate emissions of particulate matter of exhaust output by the engine 10. Exhaust aftertreatment system 118 further includes a delta pressure sensor 114'. In the illustrated embodiment, delta pressure sensor 114' is configured and provided in the form of delta pressure sensor unit which is configured to sense a pressure difference across DPF 117. In other embodiments, delta pressure sensor 114' may be provided in other forms, for example, as a combination of two separate delta pressure sensors configured to sense respective pressures from which pressure difference across the DPF 117 can be determined, or in other forms as will occur to one of skill in the art.

While not depicted in FIG. 1, exhaust aftertreatment system 118 may additionally or alternatively include one or more other aftertreatment components for mitigation of emissions including, for example, a diesel oxidation catalyst (DOC), a selective catalytic reduction (SCR) system for mitigation of NOx, or particulates, or various other aftertreatment components as will occur to one of skill in the art with the benefit and insight of the present disclosure. In such embodiments, one or more additional delta pressure sensors substantially similar to delta pressure sensor 114' may be provided to sense pressure across such components. Furthermore, system 100 may include one or more additional delta pressure sensors at various locations in intake system 102 or exhaust system 106 which are substantially similar to delta pressure sensor 114 or sensor 114' may be provided to sense pressure across various other components of or associated with intake system 102 or exhaust system 106.

Engine system 100 includes a fuel delivery system 110 operationally coupled to engine 10. Fuel delivery system 110 may be provided in a number of forms, for example, a natural gas system or other gaseous fuel systems, a gasoline system, or a dual-fuel system. When provided as a dual fuel system, fuel delivery 110 system may be configured to provide multiple fuels to the combustion chamber, for example, gaseous fuel and liquid fuel. In such systems, combustion may be controlled by the injection of the fuel which is directly or indirectly provided to the combustion cylinder. Fuel delivery system 110 may utilize port fuel injection and/or direct injection.

Engine system 100 includes an electronic control system (ECS) 116 which is configured to control a number of operational aspects of engine system 100. ECS 116 is an example of an integrated circuit-based (IC-based) electronic control system comprising control circuitry that may be provided in a number of forms and combinations. In some embodiments, the control circuitry of ECS 116 may comprise one or more microprocessors, microcontrollers, other integrated circuits, or combinations thereof which are configured to execute instructions stored in a non-transitory memory medium. It shall be appreciated that terms such as a non-transitory memory, a non-transitory memory medium, and a non-transitory memory device refer to a number of types of devices and storage mediums which may be configured to store information, such as data or instructions, readable or executable by a processor or other components of an electronic control system and that such terms include and encompass a single or unitary device or medium storing such information, multiple devices or media across or among which respective portions of such information are stored, and multiple devices or media across or among which multiple copies of such information are stored.

It shall be further appreciated that the control circuitry of ECS 116 may additionally or alternatively comprise other digital circuitry, analog circuitry, or hybrid analog-digital circuitry, or combinations thereof. Some non-limiting example elements of such circuitry include application specific integrated circuits (ASICs), arithmetic logic units (ALUs), amplifiers, analog calculating machine(s), analog to digital (A/D) and digital to analog (D/A) converters, clocks, communication ports, cores, field programmable gate arrays (FPGAs), filters, format converters, modulators or demodulators, multiplexers and de-multiplexers, non-transitory memory devices and media, oscillators, processors, processor cores, signal conditioners, state machine(s), system-on-chip components, and timers.

ECS 116 may be provided as a single component or a collection of operatively coupled components. When of a multi-component form, ECS 116 may have one or more components remotely located relative to the others in a distributed arrangement and may distribute the control function across one or more control units or devices. In some embodiments, ECS 116 may comprise multiple electronic control modules (ECMs) or electronic communication units (ECUs) configured to operatively communicate over one or more networks such as one or more controller area networks (CANs). ECS 116 is also communicatively coupled to a number of components of the engine system 100 via communication network 130. Example communication connections are illustrated in FIG. 1, although in any given embodiment connections illustrated may not be present, and/or additional connections may be present.

In the illustrated embodiment, ECS 116 is configured to provide and execute control system logic including engine system diagnostics 162, delta pressure sensor icing diagnostic 164, and other engine system control logic 166. These and other control system logic components may be provided and implemented in one or more of the above-described components of ECS 116, for example, in one or more ECUs. Engine system diagnostics 162 are configured and operable to perform one or more diagnostic operations relative to engine system 100. Engine system diagnostic(s) 162 include one or more diagnostics which rely upon information provided by a delta pressure sensor such as delta pressure sensor 114 or delta pressure sensor 114'. Examples of such diagnostics include charge air cooler leak diagnostic, diesel particulate filter soot loading, or other diagnostics, including in-operation monitoring or sensing for control purposes, of a condition or state of a diesel particulate filter, charge flow diagnostics (such as charge flow high, low, or slow response diagnostics), EGR flow diagnostics (such as EGR flow high, low, or slow response diagnostics), charge pressure diagnostics (such as charge pressure in range diagnostics), and other diagnostics as will occur to one of skill in the art with the benefit and insight of the present disclosure. Delta pressure sensor icing diagnostic 164 are configured and operable to diagnose or identify an iced sensor condition, for example, an iced condition of delta pressure sensor 114, delta pressure sensor 114', another delta pressure sensor of engine system 100, or another delta pressure sensor of another engine system. Delta pressure sensor icing diagnostic 164 further configured and operable to output an inhibit signal 163 effective to inhibit operation of engine system diagnostics 162 in response to a diagnosis or identification of an iced sensor condition. Other engine control system control logic 166 is configured and operable to control various operations of engine system 100.

Figure 2:
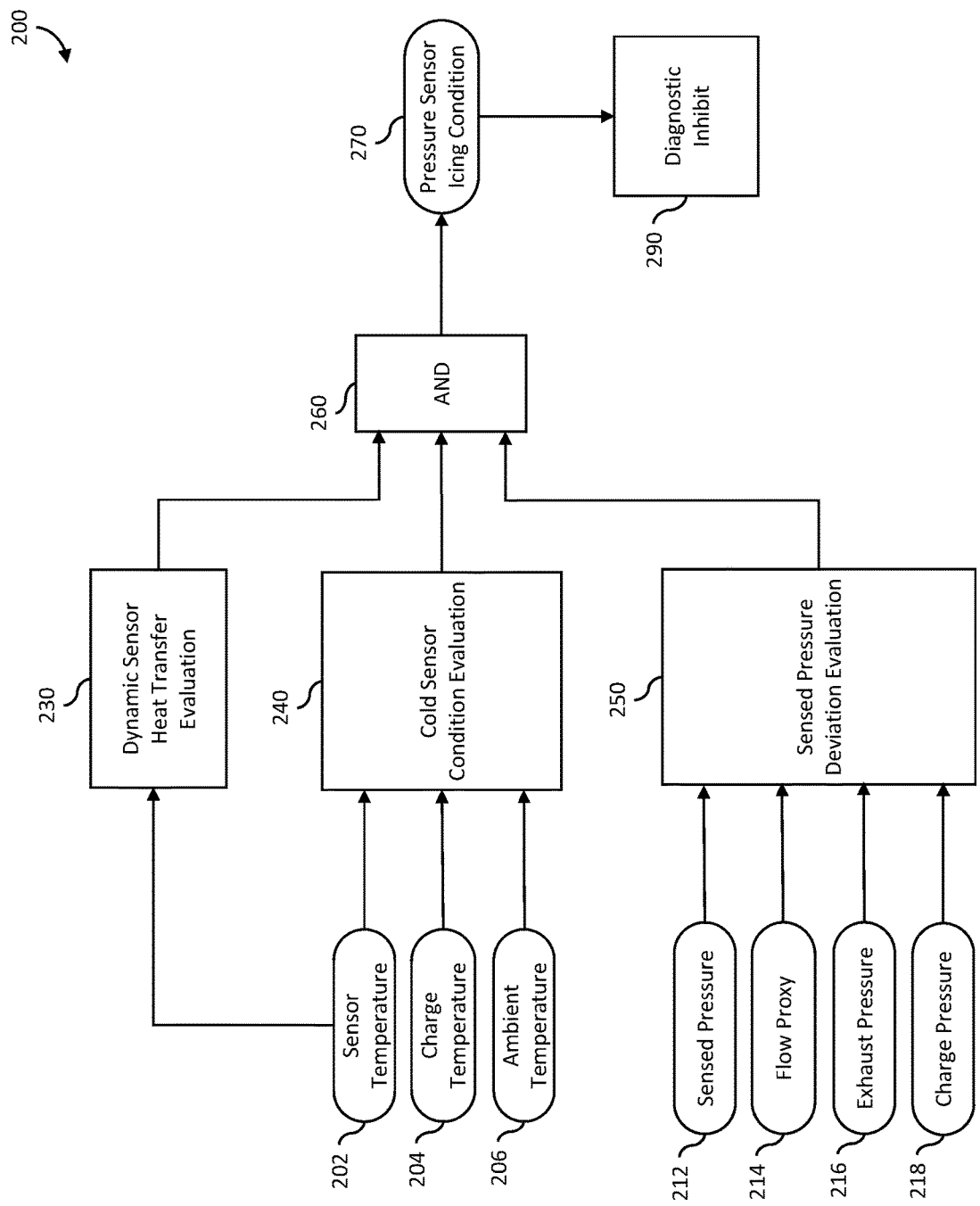
FIG. 2 is a schematic diagram illustrating certain aspects of an example electronic control system.

With reference to FIG. 2, there is illustrated example control system logic 200 which is an example of control system logic that may be utilized to implement a delta pressure sensor icing diagnostic such as delta pressure sensor icing diagnostic 164. Control system logic 200 may be implemented in one or more components or devices of an electronic control system such as ECS 116 or various other electronic control systems and which may be used in controlling the operation of an engine system such as engine system 100. In certain embodiments, control system logic 200 may be implemented as instructions stored in one or more non-transitory memory media readable executable by one or more processors, for example, one or more non-transitory memory and one or more processors of one or more ECUs. Various features and operations of control system logic 200 are described in connection with engine system 100 and components thereof. It shall be appreciated that the disclosed embodiments may also be implemented in and utilized in connection with various other electronic control systems and various other engine systems and components thereof.

Control system logic 200 includes dynamic sensor heat transfer evaluation logic 230, cold sensor condition evaluation logic 240, and sensed pressure deviation evaluation logic 250. Dynamic sensor heat transfer evaluation logic 230 is configured and operable to dynamically determine an accumulated temperature value of a delta pressure sensor such as delta pressure sensor 114, delta pressure sensor 114', another delta pressure sensor of engine system 100, or another delta pressure sensor of another engine system. In the illustrated embodiment, dynamic sensor heat transfer evaluation logic 230 receives sensor temperature 202 as input and provides output to logical AND operator 260. In other embodiments, dynamic sensor heat transfer evaluation logic 230 may additionally or alternatively receive other inputs and/or provide other outputs.

Cold sensor condition evaluation logic 240 is configured and operable to determine the existence of a cold sensor condition permitting occurrence of an iced sensor condition, for example, an iced condition of delta pressure sensor 114, delta pressure sensor 114', another delta pressure sensor of engine system 100, or another delta pressure sensor of another engine system. In the illustrated embodiment, cold sensor condition evaluation logic 240 receives sensor temperature 202, charge temperature 204, and ambient temperature 206, as inputs and provides output to logical AND operator 260. In other embodiments, cold sensor condition evaluation logic 240 may additionally or alternatively receive other inputs and/or provide other outputs.

Sensed pressure deviation evaluation logic 250 is configured and operable to determine the existence of a deviation or excursion from expected pressure values sensed by a delta pressure sensor, for example, delta pressure sensor 114, delta pressure sensor 114', another delta pressure sensor of engine system 100, or another delta pressure sensor of another engine system. In the illustrated embodiment, sensed pressure deviation evaluation logic 250 receives sensed pressure 212, flow indication 214, exhaust pressure 216, and charge pressure 218, as inputs and provides output to logical AND operator 260. In other embodiments, sensed pressure deviation evaluation logic 250 may additionally or alternatively receive other inputs and/or provide other outputs.

Logical AND operator 260 is configured to output a true logical true value in response to the outputs of dynamic sensor heat transfer evaluation logic 230, cold sensor condition evaluation logic 240, and sensed pressure deviation evaluation logic 250 (which are received as inputs by logical AND operator 260) each being true, and to otherwise output a not true or false logical value. The output of logical AND operator 260 is provided as, sets, or otherwise establishes a logical value of delta pressure sensor icing condition variable 270. The logical value of delta pressure sensor icing condition variable 270 is provided as input to diagnostic inhibit operator 290 which is configured and operable to provide an output effective to inhibit operation of engine system diagnostics, for example, inhibit signal 163 described above in connection with FIG. 1, or another output effective to inhibit operation of engine system diagnostics.

Figure 3:
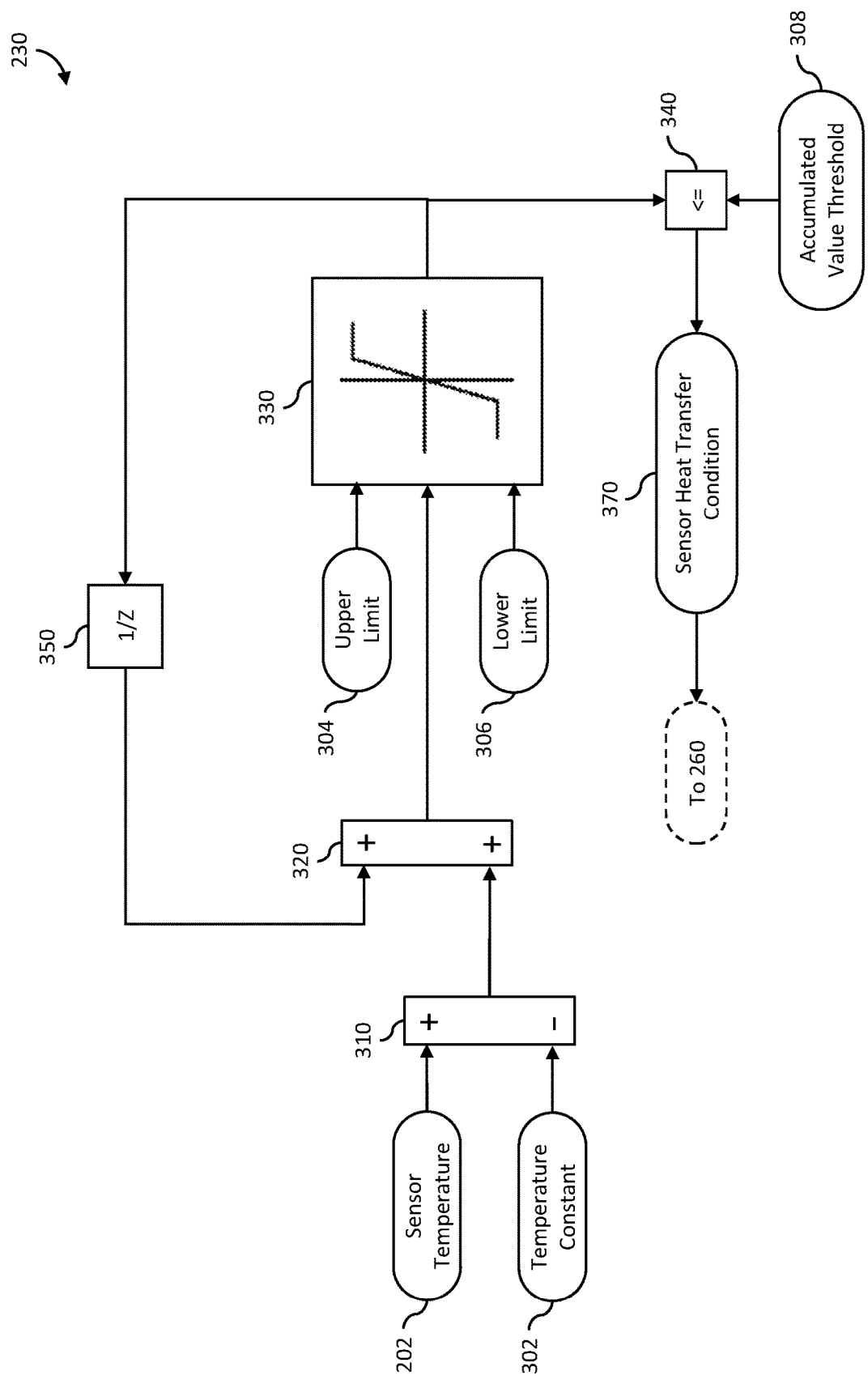
FIG. 3 is a schematic diagram illustrating certain aspects of an example electronic control system.

With reference to FIG. 3, there is illustrated an example embodiment of dynamic sensor heat transfer evaluation logic 230 which is configured to dynamically model heat transfer to or from a differential pressure sensor indicative of heating or cooling of the differential pressure sensor. The dynamic sensor heat transfer evaluation logic 230 is configured to implement a dynamic model of a sensor heat transfer condition indicative of heating or cooling of the delta pressure sensor which is updated over time. In some forms, the dynamic model may be provided in the form of an integral lump capacitance model. In some forms, the integral lump capacitance model may be configured to estimate heat transfer from exhaust or other heat sources in thermal communication with a delta pressure sensor and heat loss from the delta pressure sensor in accordance with equation (1):

$$\frac{Q_{melt}}{\rho c V} \leq \int \left( T_{exh} - T_{dP} - \frac{Q_{leakage}}{\rho c V} \right),$$

where
$Q_{melt}$ is the amount of heat transferred to the delta pressure sensor from the exhaust flow associated with the delta pressure sensor and may be calibrated so that when sufficient heat is transferred to a delta pressure sensor to melt ice formed on the sensor the inequality will be satisfied,
$\rho$ is density,
$c$ is specific heat,
$V$ is volume,
$T_{exh}$ is the temperature of exhaust flow associated with the delta pressure sensor, and
$T_{dP}$ is the temperature of the delta pressure sensor, and
$Q_{leakage}$ is heat loss from the delta pressure sensor to the surrounding environment and may be calibrated so that when insufficient heat is being transferred to melt the ice, and iced delta pressure can still be indicated.

In some embodiments, the integral lump capacitance model of Equation 1 may be implemented in modified or alternative forms. For example, the term $$\frac{Q_{melt}}{\rho c V}$$

may be represented by a first constant value, and/or the terms $$T_{dP} - \frac{Q_{leakage}}{\rho c V}$$

may be represented by a second constant value. In some embodiments, rather than being represented by a constant, term $Q_{leakage}$ may be estimated using a variety of techniques as will occur to one of skill in the art with the benefit and insight of the present disclosure.

In the illustrated embodiment, sensor temperature 202 and temperature constant 302 are provided as inputs to subtraction operator 310 which is configured to output the difference between sensor temperature 202 and temperature constant 302 by subtracting the value of temperature constant 302 from the value of sensor temperature 202 and outputting the resulting difference. Sensor temperature 202 may be a sensed temperature of a delta pressure sensor, for example, delta pressure sensor 114, delta pressure sensor 114', another delta pressure sensor of engine system 100, or another delta pressure sensor of another engine system. The sensed temperature may be provided by a temperature sensor in contact with or positioned proximate to any of such delta pressure sensors. Temperature constant 302 may be a predetermined value selected to indicate the potential occurrence of an iced sensor condition, for example, zero degrees centigrade or a value near the freezing point of water, and may be a tunable or calibratable value that may be selected during commissioning or service events.

The output of subtraction operator 310 is provided as input to summation operator 320. Summation operator 320 also receives as input a previous value 350 established based upon previous output of subtraction operator 310, for example, the immediately prior value thereof. Summation operator 320 outputs the additive some of the output of subtraction operator 310 in the previous value 350 and provides hysteresis operator 330. Upper limit 304 and lower limit 306 are also provided as input to hysteresis operator 330. Hysteresis operator 330 dynamically tracks an accumulated value of the output of summation operator 320. Thus, for example, hysteresis operator 330 will increase or decrease the accumulated value in response to an increase or decrease in the output of summation operator 320. The dynamically determine accumulated value of hysteresis operator 330 is bounded by and subject to upper limit 304 and lower limit 306. Upper limit 304 and lower limit 306 may be predetermined to provide a desired responsiveness of hysteresis operator 330 changes in the value of sensor temperature 202, for example, the occurrence of the following in response to increases in the value of sensor temperature 202, or the occurrence of refreezing in response to decreases in the value of sensor temperature 202.

The accumulated value tracked by hysteresis operator 330 is provided as input to comparison operator 340. Accumulated value threshold 308 is also provided as input to comparison operator 340. Comparison operator 340 compares the value of the accumulated value tracked by hysteresis operator 330 and the accumulated value threshold 308. Comparison operator 340 when the accumulated value tracked by hysteresis operator 330 is less than or equal to the accumulated value threshold 308 and otherwise outputs false. The output of comparison operator 340 is provided as, sets, or otherwise establishes a logical value of sensor heat transfer condition variable 370. The logical value of sensor heat transfer condition variable 370 may be affirmative or true (indicating that dynamic sensor heat transfer evaluation logic 230 has determined a sensor heat transfer condition indicative of insufficient heat transfer to mitigate icing of the delta pressure sensor, i.e., insufficient heating to melt ice formed or deposited on the delta pressure sensor) or negative or false (indicating that dynamic sensor heat transfer evaluation logic 230 has not determined the dynamic sensor heat transfer condition indicative of insufficient heat transfer to mitigate icing of the delta pressure sensor, i.e., sufficient heating to melt ice formed or deposited on the delta pressure sensor). The output of comparison operator 340 is provided as input to AND operator 260 as illustrated and described in connection with FIG. 2. It shall be appreciated that comparison operator 340 may be provided with other forms of logic configured to evaluate the accumulated value tracked by hysteresis operator 330 relative to the accumulated value threshold 308. It shall be further appreciated less than or equal to logic such as that of comparison operator 340 may be provided as less than logic and that both such alternatives are understood to connote and include one another unless expressly stated to the contrary. Similarly, greater than or equal to logic may be provided as greater than logic, and that both such alternatives are understood to connote and include one another unless expressly stated to the contrary.

Figure 4:
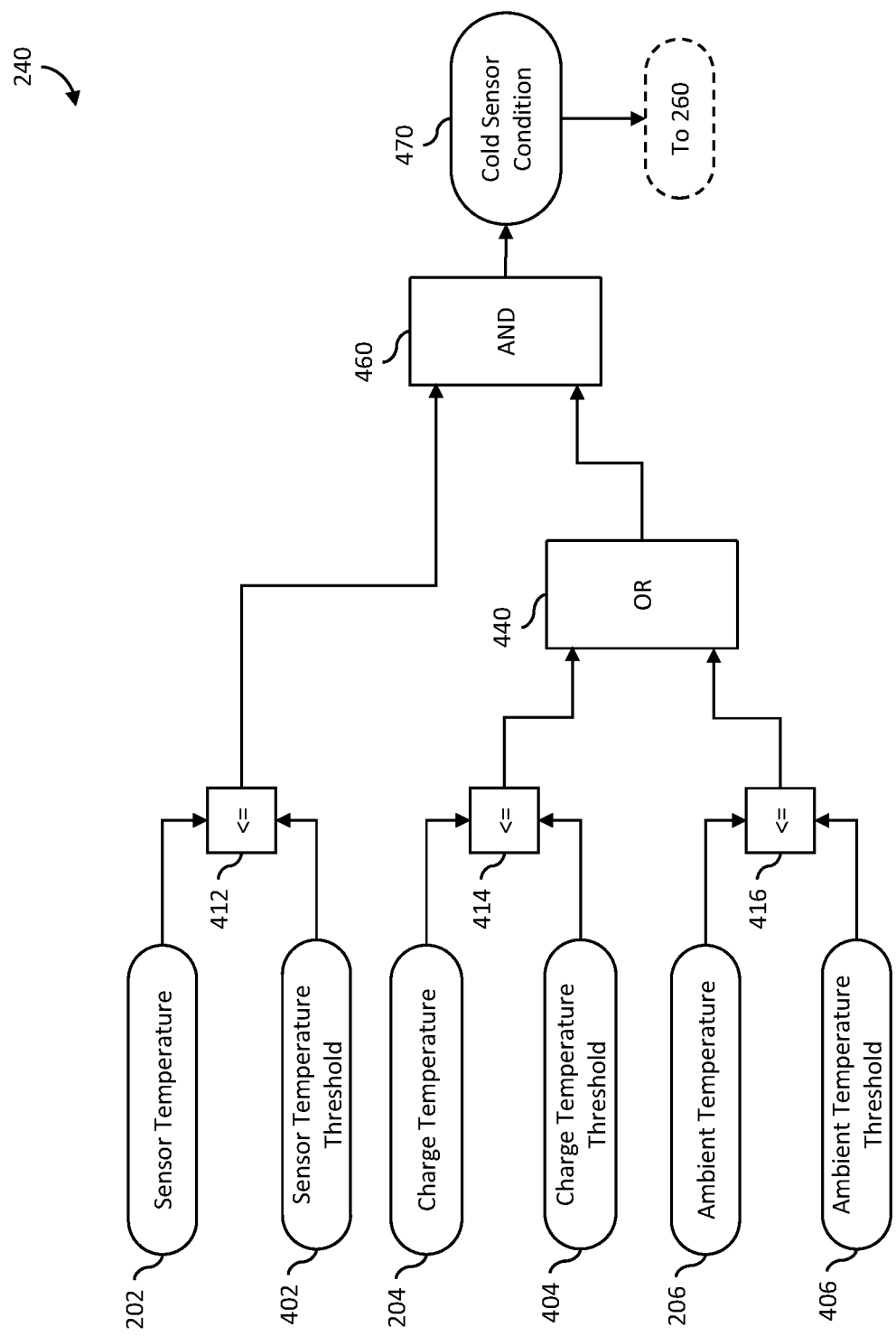
FIG. 4 is a schematic diagram illustrating certain aspects of an example electronic control system.

With reference to FIG. 4, there is illustrated an example embodiment of cold sensor condition evaluation logic 240. In the illustrated embodiment, sensor temperature 202 and sensor temperature threshold 402 are provided as inputs to comparison operator 412 which is configured to output true if sensor temperature 202 is less than or equal to sensor temperature threshold 402. The output of comparison operator 412 is provided as input to logical AND operator 460.

Charge temperature 204 and charge temperature threshold 404 are provided as inputs to comparison operator 414 which is configured to output true if charge temperature 204 is less than or equal to charge temperature threshold 404. The output of comparison operator 414 is provided as input to logical OR operator 440. Charge temperature 204 may be a sensed temperature provided by an intake system temperature sensor, for example, a temperature of intake charge of intake manifold 10a of intake system 102, another temperature of intake system 102, or another temperature of another intake system. The sensed temperature may be provided by a temperature sensor in or proximate any of such intake system components or locations. Charge temperature threshold 404 may be a predetermined value selected to define cold intake charge conditions, for example, zero degrees centigrade or a value near the freezing point of water, and may be a tunable or calibratable value that may be selected during commissioning or service events.

Ambient temperature 206 and ambient temperature threshold 406 are provided as inputs to comparison operator 416 which is configured to output true if ambient temperature 206 is less than or equal to charge ambient temperature threshold 406. The output of comparison operator 416 is provided as input to logical OR operator 440. Ambient temperature 206 may be a sensed temperature provided by an ambient temperature sensor. The sensed temperature may be provided by a temperature sensor in or proximate any ambient location. Ambient temperature threshold 406 may be a predetermined value selected to define cold intake charge conditions, for example, zero degrees centigrade a value near the freezing point of water, and may be a tunable or calibratable value that may be selected during commissioning or service events.

The output of logical OR operator 440 is provided as input to logical AND operator 460 which outputs true if the output of logical OR operator 440 and the output of comparison operator 412 are true and otherwise outputs false. The output of logical AND operator 460 is provided as, sets, or otherwise establishes a logical value of cold sensor condition variable 470. The logical value of cold sensor condition variable 470 may be affirmative or true (indicating that cold sensor condition evaluation logic 240 has determined a cold sensor condition indicative of a delta pressure sensor temperature permitting icing of the delta pressure sensor) or negative or false (indicating that cold sensor condition evaluation logic 240 has not determined the cold sensor condition). The logical value of cold sensor condition variable 470 is provided as input to logical AND operator 260.

Figure 5:
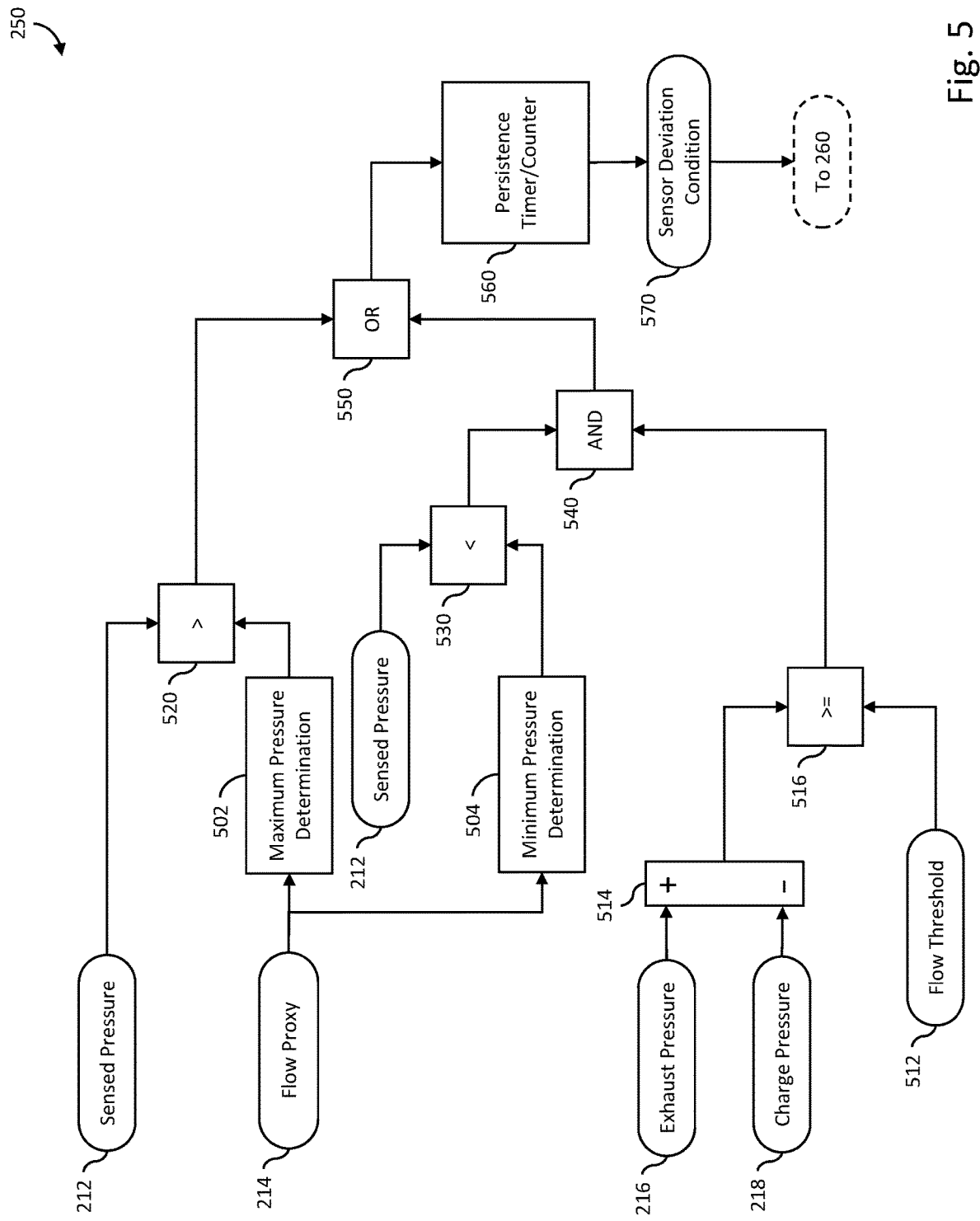
FIG. 5 is a schematic diagram illustrating certain aspects of an example electronic control system.

With reference to FIG. 5, there is illustrated an example embodiment of sensed pressure deviation evaluation logic 250. In the illustrated embodiment, sensed pressure 212 is provided as an input to comparison operator 520. Sensed pressure 212 may be a sensed pressure value provided by a delta pressure sensor being evaluated for an iced sensor condition, for example, delta pressure sensor 114, delta pressure sensor 114', another delta pressure sensor of engine system 100, or another delta pressure sensor of another engine system.

Flow indication 214 is provided as an input to maximum pressure determination operator 502. Flow indication 214 may be a sensed or calculated value indicative of a fluid flow through a delta pressure sensor being evaluated for an iced sensor condition. For example, in the case of delta pressure sensor 114, flow indication 214 may be sensed EGR valve position which is correlated with flow through an EGR valve under a given set of operating conditions. As a further example, in the case of delta pressure sensor 114', flow indication 214 may be a calculated exhaust flow which may be determined in response to combustion inputs to an engine, such as, intake charge pressure and temperature, engine speed, and fueling.

Maximum pressure determination operator 502 is configured to determine and output a maximum expected pressure corresponding to the value of flow indication 214. Maximum pressure determination operator 502 may be implemented, for example, as a lookup table with empirically determined output values for a range of values of flow indication 214, or as a calculation or computation which may be based on a physical or parameterized model of expected output pressures corresponding to flow indication 214.

The output of maximum pressure determination operator 502 is provided as input to comparison operator 520 which compares the value of sensed pressure 212 with the value of the output of maximum pressure determination operator 502. Comparison operator 520 outputs true if the value of sensed pressure 212 is greater than the value output by maximum pressure determination operator 502 and otherwise outputs false. The output of comparison operator 520 is provided as input to logical OR operator 550.

Flow indication 214 is also provided as an input to minimum pressure determination operator 504 which is configured to determine and output a minimum expected pressure corresponding to the value of flow indication 214. Minimum pressure determination operator 504 may be implemented, for example, as a lookup table with empirically determined output values for a range of values of flow indication 214, or as a calculation or computation which may be based on a physical or parameterized model of expected output pressures corresponding to flow indication 214.

The output of minimum pressure determination operator 504 is provided as input to comparison operator 530 which compares the value of sensed pressure 212 with the value of the output of minimum pressure determination operator 504. Comparison operator 530 outputs true if the value of sensed pressure 212 is less than the value output by minimum pressure determination operator 504 and otherwise outputs false. The output of comparison operator 530 is provided as input to logical AND operator 540.

Exhaust pressure 216 and charge pressure 218 are provided as inputs to subtraction operator 514 which is configured to output the difference between exhaust pressure 216 and charge pressure 218, for example, by subtracting the value of charge pressure 218 from the value of exhaust pressure 216 and outputting the resulting difference or by other mathematical operations which may be performed to determine the difference between exhaust pressure 216 and charge pressure 218. Exhaust pressure 216 may be a sensed pressure provided by an exhaust system delta pressure sensor, for example, a delta pressure sensor of exhaust manifold 10b of exhaust system 106, another pressure of exhaust system 106, or another pressure of another exhaust system. Charge pressure 218 may be a sensed pressure provided by an intake system delta pressure sensor, for example, a pressure sensed by a delta pressure sensor of intake manifold 10a of intake system 102, another pressure of intake system 102, or another pressure of another intake system.

Flow indication 214 may be a sensed or calculated value indicative of a fluid flow through a delta pressure sensor being evaluated for an iced sensor condition. For example, in the case of delta pressure sensor 114, flow indication 214 may be sensed EGR valve position which is correlated with flow through an EGR valve under a given set of operating conditions. As a further example, in the case of delta pressure sensor 114', flow indication 214 may be a calculated exhaust flow which may be determined in response to combustion inputs to an engine, such as, intake charge pressure and temperature, engine speed, and fueling.

The output of subtraction operator 514 and flow threshold 512 are provided as inputs to comparison operator 516 which compares the value output by subtraction operator 514 with the value of flow threshold 512. Flow threshold may be a predetermined value selected to establish whether sufficient fluid flow is present to permit a meaningful evaluation of a delta pressure sensor icing condition. Comparison operator 516 outputs true if the value output by subtraction operator 514 is greater than or equal to the value of flow threshold 512 and otherwise outputs false. The output of comparison operator 516 is provided as input to logical AND operator 540.

Logical AND operator 540 outputs true when the output of comparison operator 530 and the output of comparison operator 516 are true and otherwise outputs false. The output of logical AND operator 540 is provided as input to logical OR operator 550. Logical OR operator 550 outputs true when either or both of the output of comparison operator 520 and the output of logical AND operator is or are true and otherwise outputs false. The output of logical OR operator is provided as input to persistence timer/counter 560. The output of persistence timer/counter 560 is provided as, sets, or otherwise establishes a logical value of sensor deviation condition variable 570. The logical value of sensor deviation condition variable 570 may be affirmative (indicating that sensed pressure deviation evaluation logic 250 has determined a sensed pressure deviation condition indicative of a deviation of the pressure difference sensed by the delta pressure sensor from one or more sensed pressure limits) or negative (indicating that sensed pressure deviation evaluation logic 250 has not determined the sensed pressure deviation condition). The logical value of sensor deviation condition variable 570 is provided as input to logical AND operator 260.

Figure 6:
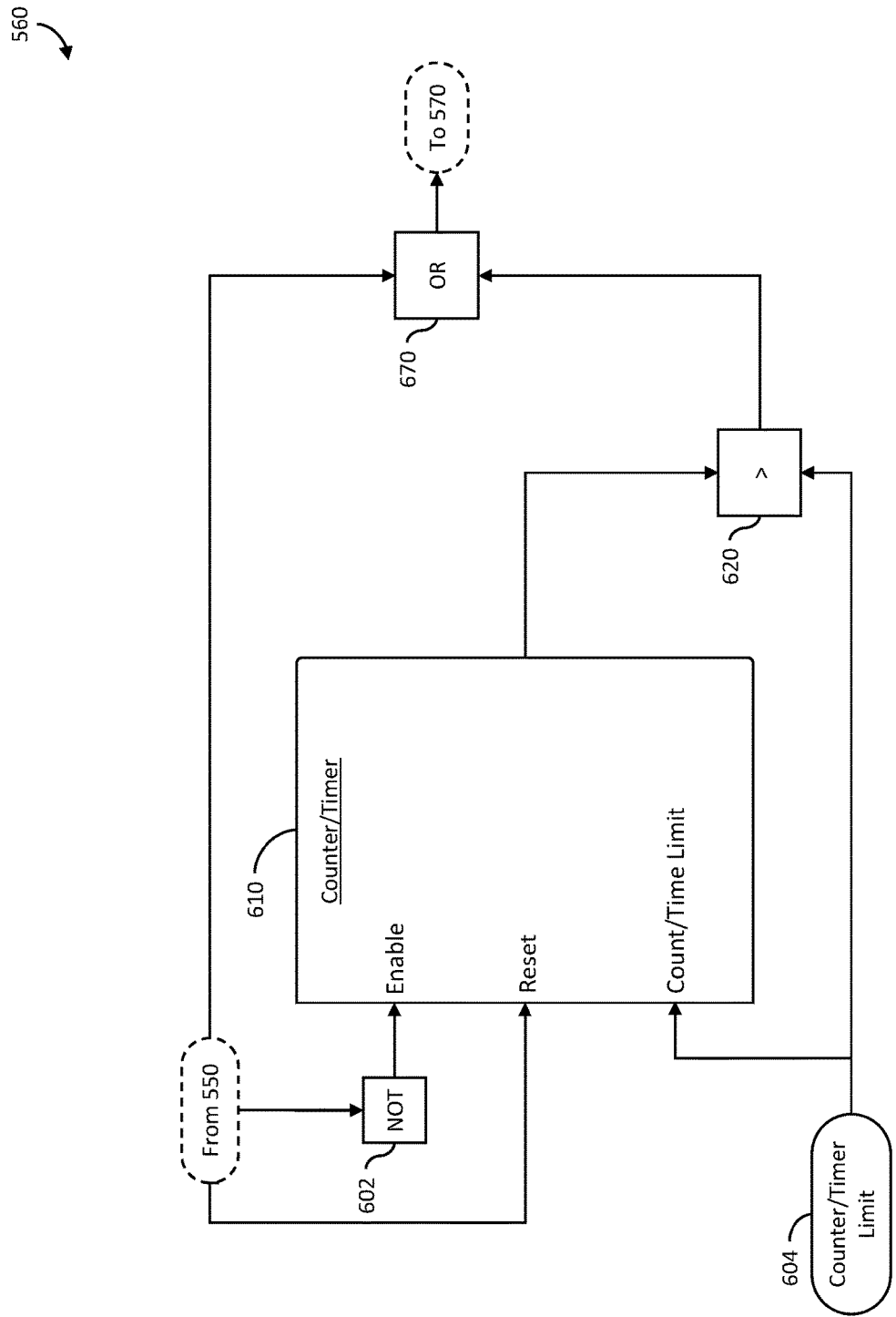
FIG. 6 is a schematic diagram illustrating certain aspects of an example electronic control system.

With reference to FIG. 6, there is illustrated an example embodiment of persistence timer/counter 560. In the illustrated embodiment, the output of logical OR operator 550 is provided as input to logical NOT operator 602 and to reset input of counter/timer 610. The output of logical NOT operator is provided to the enable input of counter/timer 610. A counter/timer limit 604 is provided to the count/time input of counter/timer 610. In response to these inputs, counter/timer 610 is configured to count or time an amount or duration corresponding to counter/timer limit for which the output of logical OR operator is false and to reset and begin anew this operation any time the output of logical OR operator 550 is true.

The output of counter/timer 610 is provided as input to comparison operator 620 which also receives counter/timer limit 604 as input. Comparison operator 620 outputs true if the value of the output of counter/timer 610 is greater than the value of counter/timer limit 604 (thus indicating that the counter/timer limit 604 has not been met) and otherwise outputs false. Furthermore, the output of logical OR operator 550 and the output of comparison operator 620 are provided as inputs to logical OR operator 670 which outputs true if either or both of the received inputs is true and otherwise outputs false. The output of logical OR operator 670 is, in turn, provided as or used to establish the logical value of sensor deviation condition variable 570.

From the foregoing description it shall be appreciated that persistence timer/counter 560 is configured and operable to establish the value of sensor deviation condition variable 570 as affirmative or true (indicating a sensor deviation condition) as soon as the output of logical OR operator 550 is true (i.e., as soon as either a sensor high deviation condition is established by comparison operator 520 or sensor low deviation with minimum flow condition is established by comparison operator 530, comparison operator 516 and logical AND operator 540). Furthermore, the value of sensor deviation condition variable 570 true will thereafter remain true unless and until persistence timer/counter 560 reaches counter/timer limit 604 without being reset by an intervening occurrence of the output of logical OR operator 550 being true.

A number of example embodiments are contemplated. A first example embodiment is an engine system comprising: a delta pressure sensor configured to sense a pressure difference across an engine exhaust handling component, the delta pressure sensor including one or more structural features susceptible to impairment by icing; an electronic control system in operative communication with the delta pressure sensor and configured to perform the operations of: determining a cold sensor condition permitting icing of the delta pressure sensor, determining a sensed pressure deviation condition indicative of deviation of the pressure difference sensed by the delta pressure sensor from a deviation limit, dynamically modeling a sensor heat transfer condition indicative of heating or cooling of the delta pressure sensor, determining that the sensor heat transfer condition is indicative of insufficient heating of the delta pressure sensor to mitigate icing of the delta pressure sensor, and determining an icing condition of the delta pressure sensor in response to each of the determining the cold sensor condition, the determining the sensed pressure deviation condition, and the determining that the sensor heat transfer condition is indicative of insufficient heating of the delta pressure sensor to mitigate icing of the delta pressure sensor.

A second example embodiment includes the features of the first example embodiment, wherein the electronic control system is configured to perform the operation of disabling a diagnostic of the engine system in response to the icing condition being determined and enabling the diagnostic of the engine system in response to the icing condition not being determined.

A third example embodiment includes the features of the first example embodiment, wherein the operation of dynamically modeling the sensor heat transfer condition indicative of heating or cooling of the delta pressure sensor comprises dynamically calculating an accumulated sensor temperature over time, and decreasing or increasing the sensor heat transfer condition in response to the accumulated sensor temperature.

A fourth example embodiment includes the features of the third example embodiment, wherein the increasing the sensor heat transfer condition is constrained by an upper limit.

A fifth example embodiment includes the features of the first example embodiment, wherein the deviation limit is determined in response to a flow indication indicative of exhaust flow across the engine exhaust handling component.

A sixth example embodiment includes the features of the fifth example embodiment, wherein the deviation limit includes a maximum expected pressure difference determined in response to the flow indication and a minimum expected pressure difference determined in response to the flow indication.

A seventh example embodiment includes the features of the first example embodiment, wherein the engine exhaust handling component comprises an EGR valve.

An eighth example embodiment includes the features of the first example embodiment, wherein the operation of determining the cold sensor condition comprises: determining an ambient temperature below an ambient temperature threshold, and determining at least one of a charge temperature below a charge temperature threshold and a delta pressure sensor temperature below a delta pressure sensor temperature threshold.

A ninth example embodiment is a method of detecting icing of delta pressure sensor configured to sense a pressure difference across an engine exhaust handling component of an engine system, the method comprising: determining a cold sensor condition permitting icing of the delta pressure sensor, determining a sensed pressure deviation condition indicative of deviation of the pressure difference sensed by the delta pressure sensor from a deviation limit, dynamically modeling a sensor heat transfer condition indicative of heating or cooling of the delta pressure sensor, determining that the sensor heat transfer condition is indicative of insufficient heating of the delta pressure sensor to mitigate icing of the delta pressure sensor, and determining an icing condition of the delta pressure sensor in response to each of the determining the cold sensor condition, the determining the sensed pressure deviation condition, and the determining that the sensor heat transfer condition is indicative of insufficient heating of the delta pressure sensor to mitigate icing of the delta pressure sensor.

A tenth example embodiment includes the features of the ninth example embodiment, and further comprises disabling a diagnostic of the engine system in response to the icing condition being determined and enabling the diagnostic of the engine system in response to the icing condition not being determined.

An eleventh example embodiment includes the features of the ninth example embodiment, wherein the dynamically modeling the sensor heat transfer condition indicative of heating or cooling of the delta pressure sensor comprises dynamically calculating an accumulated sensor temperature over time, and decreasing or increasing the sensor heat transfer condition in response to the accumulated sensor temperature.

A tenth twelfth embodiment includes the features of the eleventh example embodiment, wherein the increasing the sensor heat transfer condition is constrained by at least one of an upper limit and a lower limit.

A thirteenth example embodiment includes the features of the ninth example embodiment, wherein the deviation limit is determined in response to a flow indication indicative of exhaust flow across the engine exhaust handling component.

A fourteenth example embodiment includes the features of the thirteenth example embodiment, wherein the deviation limit includes a maximum expected pressure difference determined in response to the flow indication and a minimum expected pressure difference determined in response to the flow indication.

A fifteenth example embodiment is an apparatus comprising: one or more non-transitory memory media configured to store instructions executable by one or more processors to: determine a cold sensor condition permitting icing of a delta pressure sensor configured to sense a pressure difference across an exhaust handling component of an engine system, determine a sensed pressure deviation condition indicative of deviation of the pressure difference sensed by the delta pressure sensor from a deviation limit, update a dynamic model of a sensor heat transfer condition indicative of heating or cooling of the delta pressure sensor, determine that the sensor heat transfer condition is indicative of insufficient heating of the delta pressure sensor to mitigate icing of the delta pressure sensor, and determine an icing condition of the delta pressure sensor in response to each of the determining the cold sensor condition, the determining the sensed pressure deviation condition, and the determining that the sensor heat transfer condition is indicative of insufficient heating of the delta pressure sensor to mitigate icing of the delta pressure sensor.

A sixteenth example embodiment includes the features of the fifteenth example embodiment, wherein the instructions executable by one or more processors to disable a diagnostic of the engine system in response to the icing condition being determined and enable the diagnostic of the engine system in response to the icing condition not being determined.

A seventeenth example embodiment includes the features of the fifteenth example embodiment, wherein the dynamic model is configured to calculate an accumulated sensor temperature over time, and decrease or increase the sensor heat transfer condition in response to the accumulated sensor temperature.

An eighteenth example embodiment includes the features of the seventeenth example embodiment, wherein the increasing the sensor heat transfer condition is constrained by an upper limit.

A nineteenth example embodiment includes the features of the fifteenth example embodiment, wherein the deviation limit is determined in response to a flow indication indicative of exhaust flow across the engine exhaust handling component.

A twentieth example embodiment includes the features of the nineteenth example embodiment, wherein the deviation limit includes a maximum expected pressure difference determined in response to the flow indication and a minimum expected pressure difference determined in response to the flow indication.

While example embodiments of the disclosure have been illustrated and described in detail in the drawings and foregoing description, the same is to be considered as illustrative and not restrictive in character, it being understood that only certain example embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. An engine system comprising:
a delta pressure sensor configured to sense a pressure difference across an engine exhaust handling component, the delta pressure sensor including one or more structural features susceptible to impairment by icing; and
an electronic control system in operative communication with the delta pressure sensor and configured to perform the operations of:
determining a cold sensor condition permitting icing of the delta pressure sensor;
determining a sensed pressure deviation condition indicative of deviation of the pressure difference sensed by the delta pressure sensor from a deviation limit;
dynamically modeling a sensor heat transfer condition indicative of heating or cooling of the delta pressure sensor, the dynamically modeling accounting for heat transfer to the delta pressure sensor and heat loss from the delta pressure sensor;
determining that the sensor heat transfer condition is indicative of insufficient heating of the delta pressure sensor to mitigate icing of the delta pressure sensor; and
determining an icing condition of the delta pressure sensor is present only if the cold sensor condition permitting icing of the delta pressure sensor, the sensed pressure deviation condition indicating the pressure difference sensed by the delta pressure sensor deviates from the deviation limit, and the sensor heat transfer condition indicating insufficient heating of the delta pressure sensor to mitigate icing of the delta pressure sensor are all determined as true.

2. The engine system of claim 1, wherein the electronic control system is configured to perform the operation of disabling a diagnostic of the engine system in response to the icing condition being determined and enabling the diagnostic of the engine system in response to the icing condition not being determined.

3. The engine system of claim 1, wherein the operation of dynamically modeling the sensor heat transfer condition indicative of heating or cooling of the delta pressure sensor comprises dynamically tracking an accumulated sensor temperature over time with a hysteresis operator bound by an upper limit and a lower limit responsive to changes in value of a temperature sensor input for the delta pressure sensor over time, and decreasing or increasing the sensor heat transfer condition in response to the accumulated sensor temperature.

4. The engine system of claim 3, wherein the increasing the sensor heat transfer condition is constrained by the upper limit.

5. The engine system of claim 1, wherein the deviation limit is determined in response to a flow indication indicative of exhaust flow across the engine exhaust handling component.

6. The engine system of claim 5, wherein the deviation limit includes a maximum expected pressure difference determined in response to the flow indication and a minimum expected pressure difference determined in response to the flow indication.

7. The engine system of claim 1, wherein the engine exhaust handling component comprises an EGR valve.

8. The engine system of claim 1, wherein the operation of determining the cold sensor condition comprises:
   determining an ambient temperature below an ambient temperature threshold; and
   determining at least one of a charge temperature below a charge temperature threshold and a delta pressure sensor temperature below a delta pressure sensor temperature threshold.

9. The engine system of claim 1, wherein the accounting for heat transfer to the delta pressure sensor and heat loss from the delta pressure sensor includes accounting for at least heat transfer from exhaust to the delta pressure sensor and heat loss from the delta pressure sensor to the ambient environment.

10. The engine system of claim 9, wherein the accounting uses a lump capacitance model of the delta pressure sensor.

11. A method of detecting icing of delta pressure sensor configured to sense a pressure difference across an engine exhaust handling component of an engine system, the method comprising:
   determining a cold sensor condition permitting icing of the delta pressure sensor;
   determining a sensed pressure deviation condition indicative of deviation of the pressure difference sensed by the delta pressure sensor from a deviation limit;
   dynamically modeling a sensor heat transfer condition indicative of heating or cooling of the delta pressure sensor, the dynamically modeling including at least a first model component accounting for heat transfer to the delta pressure and at least a second model component accounting for heat transfer from the delta pressure sensor;
   determining that the sensor heat transfer condition is indicative of insufficient heating of the delta pressure sensor to mitigate icing of the delta pressure sensor; and
   determining an icing condition of the delta pressure sensor is present only if the cold sensor condition permitting icing of the delta pressure sensor, the sensed pressure deviation condition indicating the pressure difference sensed by the delta pressure sensor deviates from the deviation limit, and the sensor heat transfer condition indicating insufficient heating of the delta pressure sensor to mitigate icing of the delta pressure sensor are all determined as true.

12. The method of claim 11, comprising disabling a diagnostic of the engine system in response to the icing condition being determined and enabling the diagnostic of the engine system in response to the icing condition not being determined.

13. The method of claim 11, wherein the dynamically modeling the sensor heat transfer condition indicative of heating or cooling of the delta pressure sensor comprises dynamically tracking an accumulated sensor temperature over time with a hysteresis operator bound by an upper limit and a lower limit responsive to changes in value of a temperature sensor input for the delta pressure sensor over time, and decreasing or increasing the sensor heat transfer condition in response to the accumulated sensor temperature.

14. The method of claim 13, wherein the increasing the sensor heat transfer condition is constrained by at least one of the upper limit and the lower limit.

15. The method of claim 11, wherein the deviation limit is determined in response to a flow indication indicative of exhaust flow across the engine exhaust handling component.

16. The method of claim 15, wherein the deviation limit includes a maximum expected pressure difference determined in response to the flow indication and a minimum expected pressure difference determined in response to the flow indication.

17. The method of claim 11, wherein the first model component accounts for a difference between a temperature of exhaust flow associated with the delta pressure sensor and a temperature of the delta pressure sensor.

18. The method of claim 11, wherein the second model component accounts for heat leakage from the delta pressure sensor to its surrounding environment.

19. An apparatus comprising:
   one or more non-transitory memory media configured to store instructions executable by one or more processors to:
   determine a cold sensor condition permitting icing of a delta pressure sensor configured to sense a pressure difference across an exhaust handling component of an engine system;
   determine a sensed pressure deviation condition indicative of deviation of the pressure difference sensed by the delta pressure sensor from a deviation limit;
   update a dynamic model of a sensor heat transfer condition indicative of heating or cooling of the delta pressure sensor, the dynamic model modeling both heating and cooling of the delta pressure sensor;
   determine that the sensor heat transfer condition is indicative of insufficient heating of the delta pressure sensor to mitigate icing of the delta pressure sensor; and
   determine an icing condition of the delta pressure sensor is present only if the cold sensor condition permitting icing of the delta pressure sensor, the sensed pressure deviation condition indicating the pressure difference sensed by the delta pressure sensor deviates from the deviation limit, and the sensor heat transfer condition indicating insufficient heating of the delta pressure sensor to mitigate icing of the delta pressure sensor are all determined as true.

20. The apparatus of claim 19, wherein the instructions executable by one or more processors to disable a diagnostic of the engine system in response to the icing condition being determined and enable the diagnostic of the engine system in response to the icing condition not being determined.

21. The apparatus of claim 19, wherein the dynamic model is configured to dynamically track an accumulated sensor temperature over time with a hysteresis operator bound by an upper limit and a lower limit responsive to changes in value of a temperature sensor input for the delta pressure sensor over time, and decrease or increase the sensor heat transfer condition in response to the accumulated sensor temperature.

22. The apparatus of claim 21, wherein the increasing the sensor heat transfer condition is constrained by the upper limit.

23. The apparatus of claim 19, wherein the deviation limit is determined in response to a flow indication indicative of exhaust flow across the engine exhaust handling component.

24. The apparatus of claim 23, wherein the deviation limit includes a maximum expected pressure difference determined in response to the flow indication and a minimum expected pressure difference determined in response to the flow indication.

25. The apparatus of claim 19, wherein the dynamic model comprises as lump capacitance model.

26. The apparatus of claim 25, wherein the lump capacitance model accounts for heat loss from the delta pressure sensor to its surrounding environment.

* * * * *